(12) United States Patent
Landmark

(10) Patent No.: US 7,605,753 B2
(45) Date of Patent: Oct. 20, 2009

(54) WIRELESS COMMUNICATION DEVICE AND METHOD FOR REDUCING INTERFERENCE IN A RECEIVER

(76) Inventor: Joakim Landmark, Rimbogatan 28, Uppsala, 75324 (SE)

(*) Notice: Subject to any disclaimer, the term of this patent is extended or adjusted under 35 U.S.C. 154(b) by 0 days.

(21) Appl. No.: 11/670,300

(22) Filed: Feb. 1, 2007

(65) Prior Publication Data

US 2008/0174477 A1    Jul. 24, 2008

Related U.S. Application Data

(63) Continuation-in-part of application No. 11/625,968, filed on Jan. 23, 2007.

(51) Int. Cl.
  *G01S 5/14* (2006.01)
(52) U.S. Cl. .................................. 342/357.1
(58) Field of Classification Search ............... 342/357.1
  See application file for complete search history.

(56) References Cited

U.S. PATENT DOCUMENTS

| 5,691,978 | A | * | 11/1997 | Kenworthy | 370/278 |
|---|---|---|---|---|---|
| 6,097,974 | A | * | 8/2000 | Camp et al. | 455/575.7 |
| 6,442,375 | B1 | * | 8/2002 | Parmentier | 455/78 |
| 6,510,308 | B1 | * | 1/2003 | Thomas et al. | 455/63.1 |
| 6,681,181 | B2 | | 1/2004 | Fielder | |
| 6,791,491 | B2 | * | 9/2004 | Talvitie | 342/357.02 |
| 6,799,050 | B1 | * | 9/2004 | Krasner | 455/456.1 |
| 6,961,019 | B1 | * | 11/2005 | McConnell et al. | 342/357.1 |
| 2004/0239559 | A1 | * | 12/2004 | King et al. | 342/357.12 |
| 2004/0247058 | A1 | * | 12/2004 | Abraham | 375/346 |
| 2006/0145915 | A1 | * | 7/2006 | Landmark | 342/357.1 |

* cited by examiner

*Primary Examiner*—Gregory C Issing
(74) *Attorney, Agent, or Firm*—Lee & Hayes, PLLC

(57) ABSTRACT

Embodiments of a wireless communication device and a method for reducing in-band interference in a positioning system receiver are generally described herein. Other embodiments may be described and claimed. In some embodiments, an adaptive filter may be used to measure interference from signals generated from coupled signals of a co-located transmitter. The interference may be subtracted from digital positioning system signals provided by the positioning system receiver. In some embodiments, the interference is not subtracted from the positioning system signals when the transmitter is not active.

19 Claims, 2 Drawing Sheets

WIRELESS COMMUNICATION DEVICE

WIRELESS COMMUNICATION DEVICE

US 7,605,753 B2

WIRELESS COMMUNICATION DEVICE AND METHOD FOR REDUCING INTERFERENCE IN A RECEIVER

RELATED APPLICATION

This application is a continuation-in-part of application Ser. No. 11/625,968 filed on Jan. 23, 2007, the entire contents of which are hereby incorporated by reference.

TECHNICAL FIELD

The present invention pertains to wireless communications. Some embodiments pertain to wireless communication devices that include global positioning system (GPS) receivers, including receivers compatible with the US Global Positioning System and/or the European Galileo Global Navigation System.

BACKGROUND

Many wireless communication devices, such as mobile handsets, include integrated GPS receivers. One issue is that transmissions by the mobile handset may interfere with the operation of the GPS receiver. For example, interference within the frequency band of GPS signals generated by transmissions of the mobile handset may add to the GPS receiver's noise degrading the GPS receiver's sensitivity.

Thus, there are general needs for methods and wireless communication devices with integrated GPS receivers that mitigate the effects of in-band interference caused by transmissions of the mobile handset. There are also general needs for methods and wireless communication devices with integrated GPS receivers with increased GPS receiver sensitivity.

DETAILED DESCRIPTION

The following description and the drawings sufficiently illustrate specific embodiments of the invention to enable those skilled in the art to practice them. Other embodiments may incorporate structural, logical, electrical, process, and other changes. Examples merely typify possible variations. Individual components and functions are optional unless explicitly required, and the sequence of operations may vary. Portions and features of some embodiments may be included in, or substituted for those of other embodiments. Embodiments of the invention set forth in the claims encompass all available equivalents of those claims. Embodiments of the invention may be referred to herein, individually or collectively, by the term "invention" merely for convenience and without intending to limit the scope of this application to any single invention or inventive concept if more than one is in fact disclosed.

Figure 1:
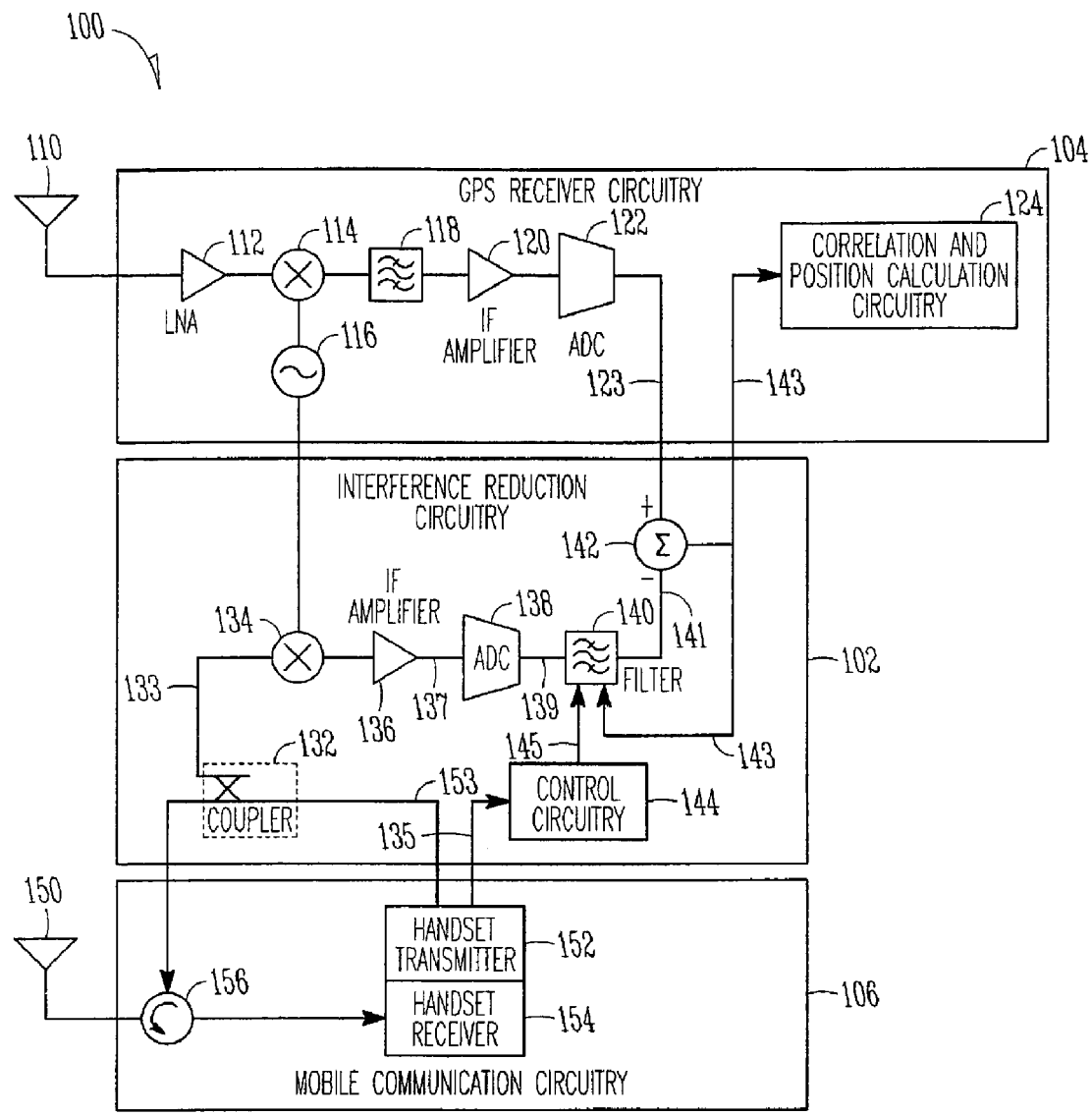
FIG. 1 is a functional block diagram of a wireless communication device with integrated receiver circuitry in accordance with some embodiments of the present invention.

FIG. 1 is a functional block diagram of a wireless communication device with integrated GPS receiver circuitry in accordance with some embodiments of the present invention. The receiver circuitry may alternatively be associated with another position system (e.g., Galileo). Wireless communication device 100 comprises interference reduction circuitry 102, GPS receiver circuitry 104, and mobile communication circuitry 106. GPS receiver circuitry 104 calculates a geographic position of wireless communication device 100 based on receipt of GPS signals from several GPS satellites. Interference reduction circuitry 102 subtracts signals representing in-band interference 141 from digital GPS signals 123 of GPS receiver circuitry 104. The in-band interference may include unwanted emissions, spurious signals, and/or in-band phase noise within a frequency band of GPS signals that may be caused by transmissions from mobile communication circuitry 106. Mobile communication circuitry 106 may provide for two-way mobile or cellular communications. Accordingly, the effects of in-band interference caused by transmissions of a mobile handset are mitigated. Furthermore, a reduction of in-band interference may result in an increased sensitivity of GPS receiver circuitry 104 allowing correlations and position calculations to be performed quicker and more accurately. These embodiments are discussed in more detail below.

In accordance with some embodiments, interference reduction circuitry 102 comprises filter 140 to operate on digitized in-band signals 139 to provide signals representing in-band interference 141, and summer 142 to subtract signals representing in-band interference 141 from digital GPS signals 123. In some embodiments, interference reduction circuitry 102 may also include control circuitry 144 to cause filter 140 to provide signals representing in-band interference 141 when mobile communication circuitry 106 is transmitting and to cause filter 140 to refrain from providing signals representing in-band interference 141 when mobile communication circuitry 106 is not transmitting. As illustrated, digitized in-band signals 139 may be generated from coupled signals 133 from mobile communication circuitry 106. These embodiments are discussed in more detail below.

In accordance with some embodiments, GPS receiver circuitry 104 may comprise low-noise amplifier (LNA) 112 to receive GPS signals through one or more GPS antennas 110, and mixer 114 to downconvert the received GPS signals using local oscillator signals from local oscillator (LO) 116. GPS receiver circuitry 104 may also include band-pass filter 118 to filter the output of mixer 114 to provide signals within a frequency band of GPS signals. GPS receiver circuitry 104 may also comprise intermediate-frequency (IF) amplifier 120 to amplify the output of band-pass filter 118 and analog-to-digital converter (ADC) 122 to sample and convert the received GPS signals to digital GPS signals 123. GPS receiver circuitry 104 may also comprise correlation and position calculation circuitry 124 to correlate the GPS signals received from several GPS satellites and to calculate a geographic position of wireless communication device 100, among other things.

In some embodiments, GPS receiver circuitry 104 may be configured to receive positioning signals from satellites of the US Global Position System. In some embodiments, GPS receiver circuitry 104 may be configured to receive positioning signals from satellites of the European Galileo Global Navigation System. As used herein, GPS signals may include positioning signals provided by the US Global Positioning System and/or the European Galileo Global Navigation System, although the scope of the invention is not limited in this respect. As used herein, the term GPS may refer to any positioning system including the US Global Positioning System and/or the European Galileo Global Navigation System.

In accordance with some embodiments, mobile communication circuitry 106 comprises handset transmitter 152 for transmitting mobile communication signals using mobile communication antenna 150, and handset receiver 154 for receiving mobile communication signals through mobile communication antenna 150. Mobile communication circuitry 106 may also comprise circuitry 156 for separating transmit and receive signals, although the scope of the invention is not limited in this respect. In some embodiments, mobile communication circuitry 106 may be configured to operate in accordance with one of the mobile or cellular communication standards, such as the Global System for Mobile Communication (GSM) specification, although the scope of the invention is not limited in this respect.

In some embodiments, digitized in-band signals 139 may be generated by downconverting coupled signals 133 from handset transmitter 152 with LO 116 common to both interference reduction circuitry 102 and GPS receiver circuitry 104. In these embodiments, interference reduction circuitry 102 may comprise coupler 132 to couple output signals 153 of handset transmitter 152 to provide coupled signals 133, and mixer 134 to downconvert coupled signals 133 using LO 116 to generate in-band signals 137. Interference reduction circuitry 102 may also comprise ADC 138 to digitize in-band signals 137 and generate digitized in-band signals 139 for receipt by filter 140. As shown, LO 116 is also used by GPS receiver circuitry 104 to downconvert received GPS signals. Accordingly, mixer 134 downconverts coupled signals 133 from handset transmitter 152 that are within a frequency band of GPS signals to in-band signals 137. In some embodiments, interference reduction circuitry 102 may also comprise IF amplifier 136 to amplify the in-band signals prior to ADC 138, although the scope of the invention is not limited in this respect.

In accordance with some embodiments, control circuitry 144 may be responsive to transmit-active signal 135 to provide control signal 145 to filter 140 to instruct filter 140 to generate signals representing in-band interference 141 from digitized in-band signals 139 when handset transmitter 152 is active. Control circuitry 144 may also be responsive to transmit-active signal 135 to provide control signal 145 to filter 140 to instruct filter 140 to provide signals representing zero interference to summer 142 when handset transmitter 152 is not active causing the summer refrain from subtracting in-band interference from digital GPS signals 123. Accordingly, when handset transmitter 152 is not transmitting (i.e., not active), nothing is subtracted from digital GPS signals 123. When handset transmitter 152 is transmitting (i.e., active), signals representing in-band interference 141 may be subtracted from digital GPS signals 123. In some alternate embodiments, instead of using transmit-active signal 135, control circuitry 144 may determine when handset transmitter 152 is active by measuring output signals 153 of handset transmitter 152, although the scope of the invention is not limited in this respect.

In some embodiments, when handset transmitter 152 is not transmitting, no signals are coupled by coupler 132 and downconverted by mixer 134. In these embodiments, there may be little or no in-band interference generated by handset transmitter 152 and little or no signal is subtracted from digital GPS signals 123 by summer 142, although the scope of the invention is not limited in this respect.

As illustrated, digitized in-band signals 139 provided to filter 140 and digital GPS signals 123 provided to summer 142 are generated with LO 116. Digitized in-band signals 139 and digital GPS signals 123 correspond to signals within the frequency band of GPS signals. Signal components common to both digitized in-band signals 139 and digital GPS signals 123 may represent in-band interference, which are provided by filter 140 and subtracted out by summer 142.

In some embodiments, filter 140 may be an adaptive filter. In these embodiments, filter 140 may perform a minimization algorithm on digitized in-band signals 139 based on summer output signals 143 to generate signals representing in-band interference 141. Summer output signals 143 may be provided to correlation and position calculation circuitry 124 of GPS receiver circuitry 104. In these embodiments, when handset transmitter 152 is not transmitting, filter 140 may be instructed to refrain from updating filter coefficients. Transmissions from mobile communication antenna 150 are received by GPS antenna 110 and any in-band interference may be provided through band-pass filter 118. This in-band interference may also be present in digitized in-band signals 139. The use of adaptive filter 140 allows interference reduction circuitry 102 to estimate interference common to both digitized in-band signals 139 and digital GPS signals 123. Accordingly, the interference common to both digitized in-band signals 139 and digital GPS signals 123 (i.e., in-band interference) may be subtracted out.

In accordance with some adaptive-filter embodiments, filter 140 updates filter coefficients when handset transmitter 152 is transmitting to minimize in-band interference present in summer output signals 143. In these embodiments, filter 140 refrains from updating filter coefficients when handset transmitter 152 is not transmitting.

In some of these adaptive-filter embodiments, the use of a minimization algorithm may help minimize the interference in the difference signal (i.e., summer output signal 143). In these embodiments, the minimization algorithm may determine and/or update filter coefficients to identify signal components (e.g., in-band interference) common to both digital GPS signals 123 and digitized in-band signals 139. In some embodiments, the minimization algorithm may be one of a Least-Mean-Squares (LMS) algorithm, a Normalized LMS (NLMS) algorithm, a Recursive Lease Squares (RLS) algorithm, or a subband NLMS (SNLMS) algorithm, although the scope of the invention is not limited in this respect. Other algorithms, such as an Autoregressive (AR) algorithm, or an AR moving average (ARMA) algorithm, may also be suitable.

In some alternate embodiments, filter 140 may be a fixed filter having a constant or predetermined transfer function. In these fixed-filter embodiments, summer output signals 143 do not need to be provided as feedback to filter 140. In these embodiments that use a fixed filter for filter 140, the transfer function of handset transmitter 152 and the transfer function of GPS receiver circuitry 104 may be fairly constant allowing the transfer function of filter 140 to be fixed, although the scope of the invention is not limited in this respect.

In some embodiments, handset transmitter 152 may be configured to generate pulsed transmissions. In these embodiments, filter 140 may generate signals representing in-band interference 141 during the pulsed transmissions and may refrain from generating signals representing in-band interference 141 between the pulsed transmissions. In these embodiments, the length of the pulsed transmissions by handset transmitter 152 may be substantially less than a length of a GPS measurement performed by GPS receiver circuitry 104, although the scope of the invention is not limited in this-respect. In some of these embodiments, handset transmitter 152 may be a TDMA transmitter, such as a transmitter configured to operate in accordance with one of the GSM standards, although the scope of the invention is not limited in this respect. In these TDMA embodiments, the transmissions by handset transmitter 152 are short compared to the time circuitry 124 uses to perform GPS measurements (e.g., a GPS measurement time). In some of these embodiments, handset transmitter 152 may transmit orthogonal frequency division multiple access (OFDMA) signals, although the scope of the invention is not limited in this respect.

In some other embodiments, handset transmitter 152 may be a continuous non-pulsed transmitter. In these embodiments, filter 140 may generate signals representing in-band interference 141 during continuous non-pulsed transmissions of handset transmitter 152. In these embodiments, the length of the continuous non-pulsed transmissions may exceed the length of a GPS measurement performed by GPS receiver circuitry 104, although the scope of the invention is not limited in this respect. In some of these embodiments, handset transmitter 152 may generate continuous non-pulsed transmissions and may be a spread-spectrum transmitter, such as wide-band code division multiple access (WCDMA) transmitter, although the scope of the invention is not limited in this respect as handset transmitter 152 may transmit other types of continuous non-pulsed transmissions.

Although wireless communication device 100 is illustrated as having several separate functional elements, one or more of the functional elements may be combined and may be implemented by combinations of software-configured elements, such as processing elements including digital signal processors (DSPs), and/or other hardware elements. For example, some elements may comprise one or more microprocessors, DSPs, application specific integrated circuits (ASICs), and combinations of various hardware and logic circuitry for performing at least the functions described herein. In some embodiments, the functional elements of wireless communication device 100 may refer to one or more processes operating on one or more processing elements.

Figure 2:
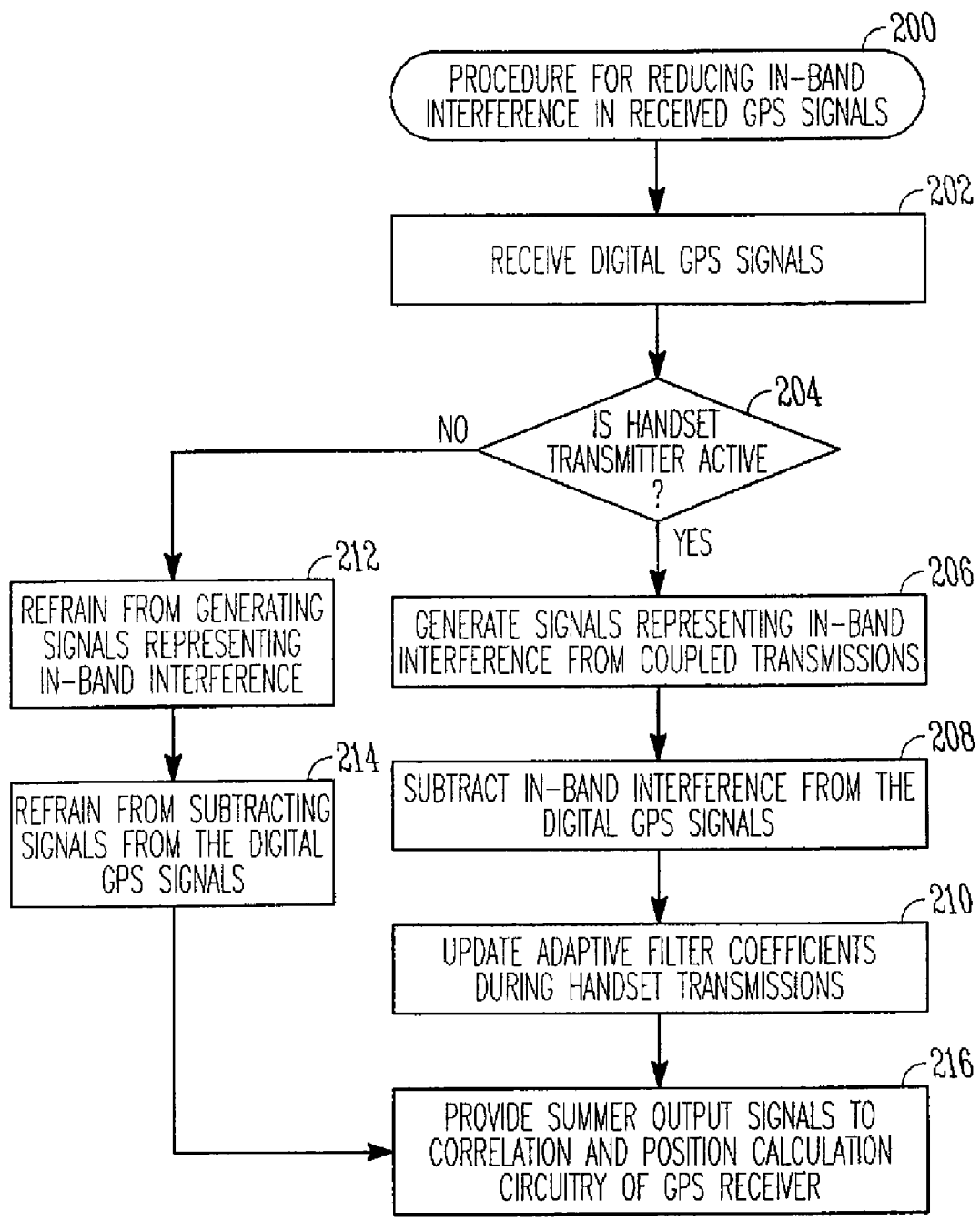
FIG. 2 is a flow chart of a procedure for reducing interference in received signals in accordance with some embodiments of the present invention.

FIG. 2 is a flow chart of a procedure for reducing interference in received GPS signals, or interference in received positioning signals associated with another positioning system (e.g., Galileo), in accordance with some embodiments of the present invention. Procedure 200 may be performed by interference reduction circuitry, such as interference reduction circuitry 102 (FIG. 1), although other circuitry may also be used to perform procedure 200. Procedure 200 determines in-band interference from handset transmissions, and subtracts the in-band interference from digital GPS signals of GPS receiver circuitry.

Operation 202 comprises receiving digital GPS signals, such as digital GPS signals 123 (FIG. 1). The digital GPS signals may be generated by GPS receiver circuitry 104 (FIG. 1) and may be provided to interference reduction circuitry 102 (FIG. 1).

Operation 204 comprises determining if a handset transmitter is active. In some embodiments, a transmit-active signal may be used to determine if the handset transmitter is active. In other embodiments, an output signal level of the handset transmitter may be used to determine if the handset transmitter is active. When the handset transmitter is active, operations 206 through 210 are performed. When the handset transmitter is not active, operations 212 through 214 are performed.

Operation 206 comprises generating signals representing in-band interference from coupled transmissions. In some embodiments, operation 206 may comprise downconverting signals from a handset transmitter that are within a frequency band of GPS signals and digitizing the downconverted signals. In some embodiments, operation 206 may generate digitized in-band signals 139 (FIG. 1).

Operation 208 comprises subtracting the in-band interference from the digital GPS signals received in operation 202 to generate difference signals. Operation 208 may be performed by summer 142 (FIG. 1) and may generate summer output signals 143 (FIG. 1).

Operation 210 comprises updating adaptive filter coefficients during handset transmissions. Operation 210 may be performed when filter 140 (FIG. 1) is an adaptive filter. In some embodiments, operation 210 may comprise performing a minimization algorithm to minimize in-band interference in the difference signals generated in operation 208.

Operation 212 comprises refraining from generating signals representing in-band interference when the handset transmitter is not active. When the handset transmitter is not active, handset transmitter 152 (FIG. 1) is not generating in-band signals that are coupled through the receive signal path of GPS receiver circuitry 104 (FIG. 1). In some embodiments, control circuitry 144 (FIG. 1) may be responsive to a transmit-active signal to cause filter 140 (FIG. 1) to refrain from providing an output, although the scope of the invention is not limited in this respect.

Operation 214 comprises refraining from subtracting signals from the digital GPS signals when the handset transmitter is not active. In some embodiments, no signal is subtracted by summer 142 (FIG. 1) when handset transmitter 152 (FIG. 1) is not transmitting.

Operation 216 comprises providing summer output signals, such as summer output signals 143 (FIG. 1), to correlation and position calculation circuitry of a GPS receiver. The summer output signals may comprise a difference signal generated by summer 142. The difference signal may comprise received GPS signals with reduced in-band interference suitable for use by correlation and position calculation circuitry 124 (FIG. 1).

Although the individual operations of procedure 200 are illustrated and described as separate operations, one or more of the individual operations may be performed concurrently, and nothing requires that the operations be performed in the order illustrated.

Unless specifically stated otherwise, terms such as processing, computing, calculating, determining, displaying, or the like, may refer to an action and/or process of one or more processing or computing systems or similar devices that may manipulate and transform data represented as physical (e.g., electronic) quantities within a processing system's registers and memory into other data similarly represented as physical quantities within the processing system's registers or memories, or other such information storage, transmission or display devices. Furthermore, as used herein, a computing device includes one or more processing elements coupled with computer-readable memory that may be volatile or non-volatile memory or a combination thereof.

Embodiments of the invention may be implemented in one or a combination of hardware, firmware, and software. Embodiments of the invention may also be implemented as instructions stored on a machine-readable medium, which may be read and executed by at least one processor to perform the operations described herein. A machine-readable medium may include any mechanism for storing or transmitting information in a form readable by a machine (e.g., a computer). For example, a machine-readable medium may include read-only memory (ROM), random-access memory (RAM), magnetic disk storage media, optical storage media, flash-memory devices, and others.

The Abstract is provided to comply with 37 C.F.R. Section 1.72(b) requiring an abstract that will allow the reader to ascertain the nature and gist of the technical disclosure. It is submitted with the understanding that it will not be used to limit or interpret the scope or meaning of the claims. The following claims are hereby incorporated into the detailed description, with each claim standing on its own as a separate embodiment.

What is claimed is:

1. Interference reduction circuitry comprising:
a signal path to generate signals representing interference from transmissions of a transmitter, the signal path comprising a mixer to downconvert signals from the transmitter using a local oscillator (LO) associated with a positioning system receiver circuit and to generate in-band signals, an analog to digital converter to digitize the in-band signals and output a digitized signal, an adaptive filter to operate on the digitized signals to provide the signals representing interference;
circuitry to remove a measured interference from received digital positioning system signals, the circuitry to remove comprising a summer to subtract the signals representing interference from the received digital positioning signals, the summer configured to provide an output signal to the adaptive filter and to the positioning system receiver circuit; and
control circuitry coupled to the transmitter to detect when the transmitter is active by measuring one or more signals output by the transmitter or in response to a transmit-active signal, the control circuitry coupled to the adaptive filter to cause the filter to provide the signals representing interference when the transmitter is active and to cause the filter to refrain from providing the signals representing interference when the transmitter is not active.

2. The interference reduction circuitry of claim 1,
wherein the positioning system receiver circuit generates the received digital positioning system signals.

3. The interference reduction circuitry of claim 2, wherein the digitized signals and the digital positioning system signals are generated with the LO, and
wherein the digitized signals and the digital positioning system signals correspond to signals within a frequency band of a global positioning system.

4. The interference reduction circuitry of claim 1,
wherein the adaptive filter performs a minimization algorithm on the digitized signals based on output signals of the summer to generate the signals representing interference, and
wherein the summer output signals are provided to correlation and position calculation circuitry of the positioning system receiver circuit.

5. The interference reduction circuitry of claim 4, wherein the filter sets or updates filter coefficients when the transmitter is transmitting to minimize in-band interference present in the output signals of the summer.

6. The interference reduction circuitry of claim 4, wherein the transmitter is configured to generate pulsed transmissions,
wherein the filter generates the signals representing interference during the pulsed transmissions,
wherein the filter refrains from generating the signals representing interference between the pulsed transmissions, and
wherein a length of the pulsed transmissions by the transmitter is less than a length of a positioning system measurement performed by the positioning system receiver circuitry.

7. The interference reduction circuitry of claim 4, wherein the transmitter is a non-pulsed transmitter, and
wherein the filter generates the signals representing interference during continuous non-pulsed transmissions, and
wherein a length of the continuous non-pulsed transmissions exceeds a length of a positioning system measurement performed by the positioning system receiver circuitry.

8. The interference reduction circuitry of claim 1, further comprising:
a coupler to couple output signals of the transmitter and provide coupled signals;
a mixer to downconvert the coupled signals using a local oscillator (LO) to in-band signals; and
an analog-to-digital converter (ADC) to digitize the in-band signals and generate the digitized signals for receipt by the filter,
wherein the LO is also used by positioning system receiver circuitry to downconvert received positioning system signals.

9. The interference reduction circuitry of claim 1, wherein the positioning system receiver circuitry, the interference reduction circuitry, and the transmitter are part of a single wireless communication device,
wherein the interference reduction circuitry reduces in-band interference from received positioning system signals caused by the transmissions from the transmitter; and
wherein the digital positioning system signals are provided by positioning system receiver circuitry configured to receive positioning signals from satellites of either the US Global Position System or the European Galileo Global Navigation System.

10. A wireless communication device comprising:
positioning system receiver circuitry to generate digital positioning system signals;
a co-located transmitter for transmitting communication signals; and
interference reduction circuitry to subtract signals representing interference from the digital positioning system signals caused by transmissions from the co-located transmitter, the interference reduction circuitry comprising:
an adaptive filter to generate signals representing interference from digitized signals that are generated from coupled signals of the transmitter,
a summer to subtract the signals representing interference from the digital positioning system signals, and
control circuitry to instruct the adaptive filter to generate the signals representing interference when the transmitter is active and to refrain from generating the signals representing interference when the transmitter is not active;
wherein the control circuitry is coupled to the co-located transmitter signal to determine when the transmitter is active,
wherein the digitized signals are generated by downconverting the coupled signals from the transmitter with a local oscillator (LO) common to the interference reduction circuitry and positioning system receiver circuitry,
wherein the positioning system receiver circuitry generates the digital positioning system signals,
wherein the control circuitry is responsive to a transmit-active signal to provide a control signal to the filter to instruct the filter to generate the signals representing interference from the digitized signals when the transmitter is active, and wherein the control circuitry is further responsive to the transmit-active signal to provide the control signal to the filter to instruct the filter to provide signals representing zero interference to the summer when the transmitter is not active causing the summer refrain from subtracting interference from the digital positioning system signals.

11. The wireless communication device of claim 10, wherein the co-located transmitter is part of mobile communication circuitry that provides for two-way mobile communications, and
wherein the positioning system receiver circuitry calculates a geographic position of the wireless communication device based on output signals from the summer.

12. The wireless communication device of claim 10,
wherein the adaptive filter performs a minimization algorithm on the digitized signals based on summer output signals to generate the signals representing interference, and
wherein the summer output signals are provided to correlation and position calculation circuitry of the positioning system receiver circuitry.

13. The wireless communication device of claim 12, wherein the filter sets or updates filter coefficients when the transmitter is transmitting to minimize interference present in the summer output signals, and
wherein the filter refrains from setting or updating the filter coefficients when the transmitter is not transmitting.

14. The wireless communication device of claim 12, wherein the transmitter is configured to generate pulsed transmissions,
wherein the filter generates the signals representing interference during the pulsed transmissions,
wherein the filter refrains from generating the signals representing interference between the pulsed transmissions, and
wherein a length of the pulsed transmissions by the transmitter is less than a length of a positioning system measurement performed by the positioning system receiver circuitry.

15. The wireless communications device of claim 12, wherein the transmitter is a non-pulsed transmitter, and
wherein the filter generates the signals representing interference during continuous non-pulsed transmissions, and
wherein a length of the continuous non-pulsed transmissions exceeds a length of a positioning system measurement performed by the positioning system receiver circuitry.

16. The wireless communication device of claim 10, wherein the positioning system receiver circuitry, the interference reduction circuitry, and the transmitter are part of a single wireless communication device,
wherein the interference reduction circuitry reduces in-band interference from received positioning system signals caused by the transmissions from the transmitter, and
wherein the digital positioning system signals are provided by positioning system receiver circuitry configured to receive positioning signals from satellites of either the US Global Position System or the European Galileo Global Navigation System.

17. A method comprising:
generating signals representing interference from signals of a transmitter, the transmitter being co-located with positioning system receiver circuitry configured to generate digital positioning system signals, wherein the generating is performed by an adaptive filter and further includes:
downconverting coupled signals from the transmitter to generate digitized signals using a local oscillator (LO) common to positioning system receiver circuitry, the downconverting performed by a mixer and an analog to digital converter, and
processing the digitized signals by the adaptive filter;
subtracting the signals representing interference from the digital positioning system signals;
setting or updating filter coefficients of the adaptive filter based on a minimization algorithm during transmissions of the transmitter to minimize a difference between the signals representing interference and the digital positioning system signals;
detecting whether the co-located transmitter is active;
responding to a transmit-active signal to cause the filter to generate the signals representing interference from the digitized signals when the transmitter is active; and
responding to the transmit-active signal to instruct the filter to provide signals representing zero interference when the transmitter is not active.

18. The method of claim 17, further comprising providing difference signals to the positioning system receiver circuitry for use in performing correlations and calculating a position,
wherein the difference signals result from a subtraction of the signals representing interference from the digital positioning system signals.

19. An integrated circuit comprising:
positioning system receiver circuitry to generate digital positioning system signals;
a co-located transmitter for transmitting communication signals; and
interference reduction circuitry to subtract signals representing interference from the digital positioning system signals caused by transmissions from the co-located transmitter, the interference reduction circuitry comprising:
a mixer to downconvert signals from the transmitter using a local oscillator (LO) common to the positioning system receiver circuitry to generate in-band signals,
an analog to digital converter to digitize the in-band signals and output a digitized signal,
a filter to generate signals representing interference from the digitized signals,
a summer to subtract the signals representing interference from the digital positioning system signals and to provide an output signal to the filter and to the positioning system receiver circuitry, and
control circuitry to instruct the filter to generate the signals representing interference when the transmitter is active and to refrain from generating the signals representing interference when the transmitter is not active,
wherein the control circuitry is coupled to the co-located transmitter to detect when the transmitter is active by measuring one or more signals output by the transmitter, and wherein the control circuitry is coupled to an adaptive filter to provide the signals representing interference when the co-located transmitter is active and to cause the filter to refrain from providing the signals representing interference when the transmitter is not active.

* * * * *